United States Patent [19]
Kuijk

[11] Patent Number: 4,927,241
[45] Date of Patent: May 22, 1990

[54] OPTICAL IMAGING SYSTEM HAVING AN ELECTRONICALLY VARIABLE FOCAL LENGTH AND OPTICAL IMAGE SENSOR PROVIDED WITH SUCH A SYSTEM

[75] Inventor: Karel E. Kuijk, Eindhoven, Netherlands

[73] Assignee: U.S. Philips Corp., New York, N.Y.

[21] Appl. No.: 411,792

[22] Filed: Sep. 25, 1989

Related U.S. Application Data

[63] Continuation of Ser. No. 78,334, Jul. 27, 1987, abandoned.

[30] Foreign Application Priority Data

Aug. 25, 1986 [NL] Netherlands .................. 8602149

[51] Int. Cl.[5] ............................................. G02F 1/13
[52] U.S. Cl. ............................... 350/336; 350/331 R; 350/347 E; 350/339 R; 350/437
[58] Field of Search ............... 350/331 R, 332, 333, 350/336, 334, 339 R, 347 E, 437

[56] References Cited

U.S. PATENT DOCUMENTS

| | | | |
|---|---|---|---|
| 3,004,470 | 7/1957 | Rühle | 350/437 |
| 4,190,330 | 2/1980 | Berreman | 350/331 R |
| 4,313,663 | 2/1982 | Stemme et al. | 350/336 |
| 4,333,720 | 6/1982 | Suzuki et al. | 350/336 |
| 4,601,545 | 7/1986 | Kerm | 350/331 R |
| 4,704,004 | 11/1987 | Nosker | 350/345 |

FOREIGN PATENT DOCUMENTS

| | | | |
|---|---|---|---|
| 2620173 | 11/1977 | Fed. Rep. of Germany | |
| 2620178 | 11/1977 | Fed. Rep. of Germany | |
| 0047021 | 4/1981 | Japan | 350/336 |
| 0023011 | 2/1983 | Japan | 350/336 |
| 60-50510 | 3/1985 | Japan | 350/331 R |
| 0156227 | 7/1986 | Japan | 350/331 R |
| 2187567 | 9/1987 | United Kingdom | 350/334 |

OTHER PUBLICATIONS

R. A. Soref, "Electrically Scanned Analog L.C.D", Applied Optics, vol. 9, No. 6, Jun. 1970.

Primary Examiner—Stanley D. Miller
Assistant Examiner—Huy K. Mai
Attorney, Agent, or Firm—Willaim L. Botjer

[57] ABSTRACT

An imaging system having an electronically variable focal length is obtained by arranging, one after the other, a lens system (10) different sectors of which have different focal lengths and a liquid crystal diaphragm (20). By selecting sectors of the lens system with the aid of the diaphragm, an object (30) can be sharply imaged also at different object lengths in an image plane (40).

7 Claims, 2 Drawing Sheets

OPTICAL IMAGING SYSTEM HAVING AN ELECTRONICALLY VARIABLE FOCAL LENGTH AND OPTICAL IMAGE SENSOR PROVIDED WITH SUCH A SYSTEM

This is a continuation of application Ser. No. 078,334, filed July 27, 1987, now abandoned.

BACKGROUND OF THE INVENTION

The invention relates to an optical imaging system having an electronically variable focal length, comprising a system of lenses and a liquid crystal layer. The invention also relates to an optical image sensor provided with such an imaging system.

A system of this type is known from German Patent Application No. 28 55 841 laid open to public inspection which corresponds to U.S. Pat. No. 4,190,330. In this Application an optical imaging system is described which consists of a lens-shaped space left in a transparent substrate and coated on the inside with transparent electrodes and orientation layers and which is filled with liquid crystal in the nematic phase. This crystal is birefringent. The refractive index for the extraordinary ray can be varied by applying an electric field. This results in a lens whose power is variable for light in one state of polarization. The ordinary ray for which the refractive index does not vary is suppressed by a polarization filter or is deflected by a second lens of this type whose orientation layers are perpendicular to those of the first lens.

A drawback of the system described in the said German Patent Application No. 28 55 841 is that the range of variation of the focal length is limited by the limited range within which the refractive index of the liquid crystal material can be varied under the influence of the electric field.

SUMMARY OF THE INVENTION

The invention has for its object to provide an optical imaging system whose focal length can be electronically varied over a large range.

To this end an optical imaging system according to the invention is characterized in that the system of lenses is divided into a plurality of sectors having different, constant focal lengths and in that the liquid crystal layer forms part of an electronically variable diaphragm for selecting sectors of the system of lenses and hence selecting a focal length. The liquid crystal, for example a nematic crystal together with a polarizer and analyzer arranged parallel thereto, is integrated to form a unit which can be rendered locally transparent or opaque by applying an electric field.

It is noted that an electronically variable diaphragm comprising a liquid crystal layer is known per se from German Patent Application No. 26 20 173 laid open to public inspection. However, this diaphragm is used to adapt the aperture of a lens system, of which the diaphragm forms part, to the quantity of light originating from a scene to be imaged and it is not used for adjusting a given focal length of the lens system. Since the imaging system according to the invention provides the possibility of selecting different focal lengths, it is possible to produce a sharp image of objects which are located at a different distance from the lens system in the case of a constant distance between the lens system and an image plane.

The system of lenses may consist of a single lens or it may be composed of a plurality of lens elements arranged one after the other. In the latter case it is possible to manufacture of a lens system with small aberrations.

The electronically variable liquid crystal diaphragm may be arranged in the radiation path in front of or behind the lens system. In the case of a composite lens system it may be alternatively arranged within the lens system. One or both of the transparent windows of the diaphragm may be lenses in the lens system.

An optical imaging system according to the invention may be further characterized in that sectors of the system of lenses having different focal lengths merge gradually. This provides the possibility of manufacturing an imaging system whose focal length is in principle continuously variable. A lens system thus characterized in which the different powers of the sectors are fixed by different curvatures of the associated lens portions has a smooth transition between the curvatures and can be manufactured in a simple manner.

An optical imaging system according to the invention may be characterized in that transitions between sectors of the system of lenses are discontinuous. The geometry of each sector can then be optimized for a given focal length so that aberrations in the lens system can be minimized. Preferably the zones of the electronically variable diaphragm which can be made transparent independently of each other correspond to the said sectors so that the focal length of the imaging system can be varied in steps.

An optical imaging system according to the invention may be characterized in that the electronically variable diaphragm comprises electrodes on either side of the liquid crystal layer, which electrodes cover substantially the entire surface of the diaphragm and in which at least one of the electrodes has a plurality of terminals so that the electrode can be connected simultaneously to different voltages producing a voltage gradient in the electrode so that a gradually varying electric field is formed in the crystal. In that case an electric field strength within the liquid crystal can be realized, which comes below the threshold voltage at which the liquid crystal diaphragm becomes transparent to radiation within a given band only. By varying the voltage at the terminals of the electrode, the width and the position of the transparent band in the liquid crystal diaphragm can be modified continuously. The shape of the band depends on the shape of the electrode and the arrangement of the terminals. A system for influencing a liquid crystal layer in this manner is known from the article "Electronically Scanned Analog Liquid Cristal Displays" by R. A. Soref in Applied Optics, Vol. 9 (June 1970), pages 1323–1329.

A preferred embodiment of an optical imaging system according to the invention is characterized in that the system of lenses is rotationally symmetrical. The sectors of the lens system having the same focal length then constitute rings around the optical axis of the system. The electronically variable liquid crystal diaphragm is preferably also rotationally symmetrical, apart from the terminals of the electrodes.

An optical imaging system according to the invention may be further characterized in that the sectors of the system of lenses have a substantially equal surface area. The light intensity of the imaging system is then independent of the focal length. If the system is rotationally symmetrical, this means that the radius of each ring increases approximately inversely proportionally to the root of the ordinal number and the width decreases approximately inversely proportionally to the root of the ordinal number.

The invention also relates to an optical image sensor comprising a system of lenses and an electronically readable radiation-sensitive detection system arranged in the focal plane of the system of lenses. An optical image sensor according to the invention is characterized in that the system of lenses is an imaging system in accordance with any one of the above-described embodiments and in that an electronic control circuit is provided for adjusting the focal length of the imaging system with the aid of a focussing signal obtained from the radiation-sensitive detection system. A focus-error signal can be derived from the radiation-sensitive detection system, for example by analysis of the contrast in the image or by analysis of frequencies in the signal which are brought about by small periodical changes in the focal length.

An optical sensor of this type is used when an object or pattern needs to be recognized rapidly and when the distance to the object or the pattern is not constant. This is the case, for example when using an industrial robot placed in automated assembly line which is suitable for a plurality of products.

BRIEF DESCRIPTION OF THE DRAWING

The invention will now be described by way of example with reference to the accompanying drawings in which.

DETAILED DESCRIPTION OF THE PREFERRED EMBODIMENT

Figure 1A:
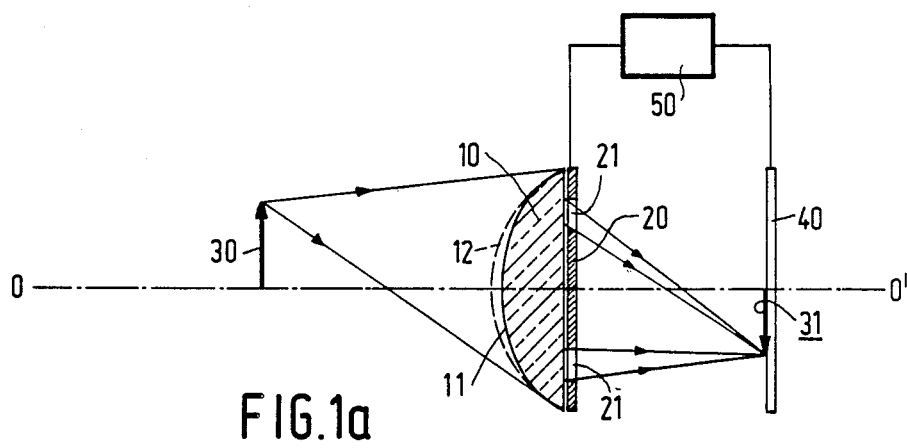
FIGS. 1a and 1b show an optical image sensor with an embodiment of an optical imaging system according to the invention.

FIG. 1a shows an optical image sensor in which an imaging system according to the invention is used as a lens system. An image 31 is formed of an object 30 on a radiation-sensitive surface 40 by means of a lens system 10. The lens system 10 is shown as a rotationally symmetrical plano-convex lens. The curvature of the surface 11 has a radial variation. The dotted line 12 indicates the average spherical curvature. A diaphragm 20 passing only radiation with a ring 21 centred around the optical axis 0–0' of the lens system is arranged on the flat side of the plano-convex lens. The position and size of the annular aperture has been chosen to be such that the radiation passing through this aperture originates from a sector of the surface 11 which has such a curvature that the object 30 is sharply imaged on the radiation-sensitive surface 40. This surface may be electronically readable and may form part of, for example a television pick-up tube or of a CCD element. By using criteria such as contrast in the observed image or the extent of intensity distributions within the image it is possible to choose the most suitable aperture in the diaphragm with the aid of a control circuit 50. This may be done, for example, by introducing small modifications in the focal length and by analyzing the resulting intensity fluctuations in the image.

Figure 1B:
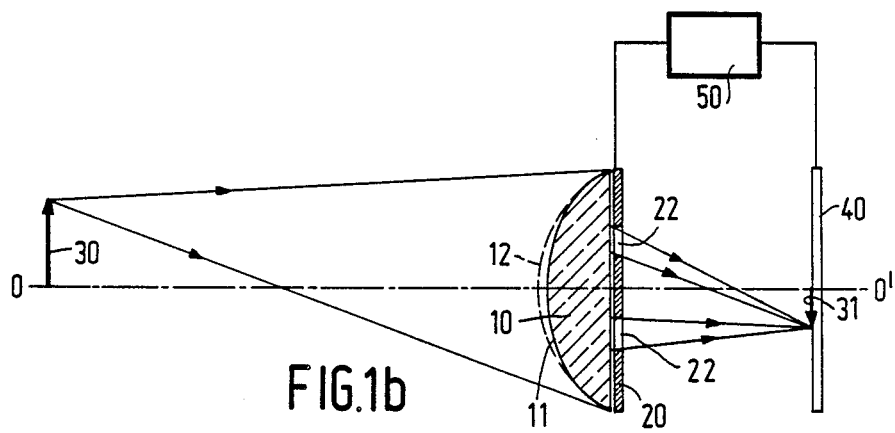

FIG. 1b shows a situation in which the object 30 is at a large distance from the lens system 10. Another ring 22 of the diaphragm 20 selects another sector of the aperture of the lens system so that the object is again sharply imaged on the radiation-sensitive surface 40.

Figure 2:
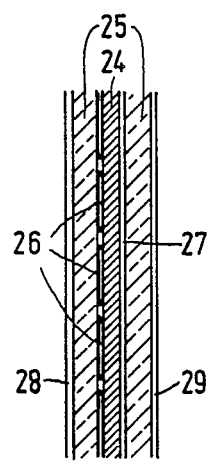
FIG. 2 shows a detailed cross-section of the diaphragm.

FIG. 2 shows in a cross-section a part of a possible embodiment of the diaphragm 20. Nematic liquid crystal 24 is enclosed between two parallel transparent plates 25. The electrode tracks 26 are provided on the inside of the one plate and the counter electrode 27 is provided on the inside of the other plate. The polarizer 28 and the analyzer 29 are arranged on the outer sides of the transparent plates 25.

Another structure of the diaphragm is also possible, for example by using a dynamically scattering liquid crystal.

It is not necessary for the lens system and the surface to be rotationally symmetrical. A lens system whose sectors with equal focal lengths have a shape different from that of a ring and are arranged, for example as sectors of a circle is alternatively possible.

Figure 3:
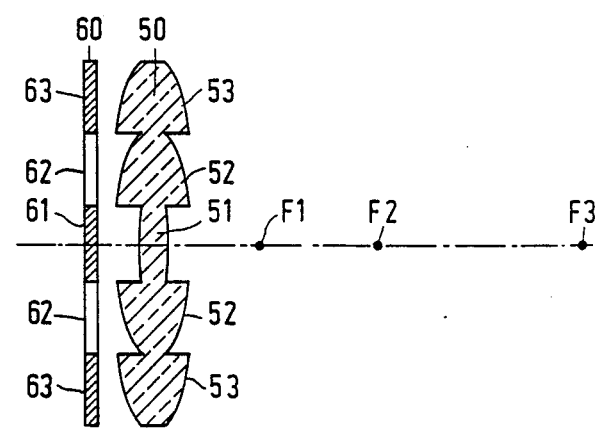
FIG. 3 shows an optical imaging system in which the sectors with different focal lengths are formed as discrete zones.

FIG. 3 diagrammatically shows a lens system whose sectors with different focal lengths are sharply separated from each other. Also in this case the lens system shown is rotationally symmetrical. It is built up of a single lens 50 which consists of a plurality, in the Figure two, annular sectors 52 and 53 surrounding a central circular sector 51. Each of the three sectors 51, 52 and 53 has a different focal length. Thus, radiation which is incident on the central sector 51 parallel to the optical axis of the lens system is focussed in the point F1 located close to the lens system, and radiation which is incident on the annular sector 52 is focussed in F2 and the peripheral annular sector 53 has a focal plane at the area of the point F3.

The diaphragm 60 arranged in the radiation path of the radiation incident on the lens 50 is also divided into three zones 61, 62 and 63 each corresponding to a sector 51, 52 or 53 of the lens. By rendering only one of the zones 61, 62 or 63 of the diaphragm 60 transparent, the zone 62 in FIG. 3, only one of the three lens sectors, 51 in FIG. 3, is selected and the imaging system has only one single focus, point F2 in FIG. 3.

Figure 4:
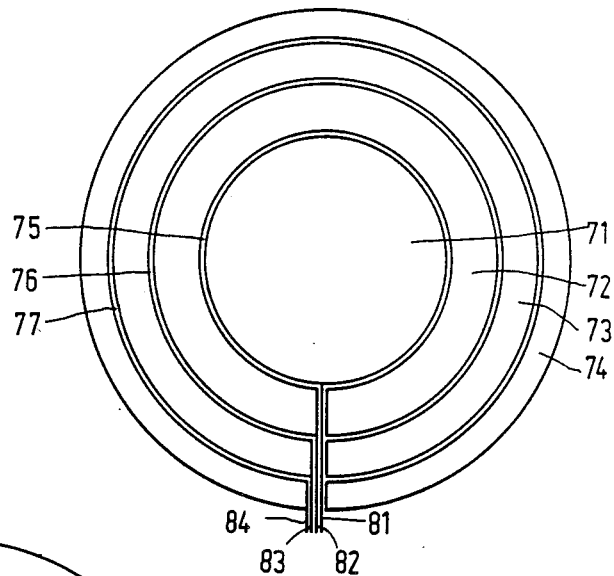
FIG. 4 shows a possible arrangement of the electrodes in a plane of the liquid crystal diaphragm and FIGS. 5a and 5b show diagrammatically the electrode and the operation of a continuously variable diaphragm.

FIG. 4 shows a possible electrode configuration as is arranged on one of the sides of the liquid crystal layer, for example on the side of the polarizer. The counter electrode on the other side may be a single electrode which covers substantially this entire surface. The composite electrode consists of a round electrode 71 which is surrounded by a plurality, three in the Figure, of substantially annular electrodes 72, 73 and 74. The electrodes are separated by narrow insulating lands 75, 76 and 77. An electric voltage may be applied to each electrode individually via the terminals 81, 82, 83 and 84 which are connected to an electronically controlled voltage source not shown. The surfaces of the electrodes 71, 72, 73 and 74 and those of the associated lens sectors are preferably substantially equal. Consequently the light power of the imaging system is equal at any selected focal length.

Figure 5A:
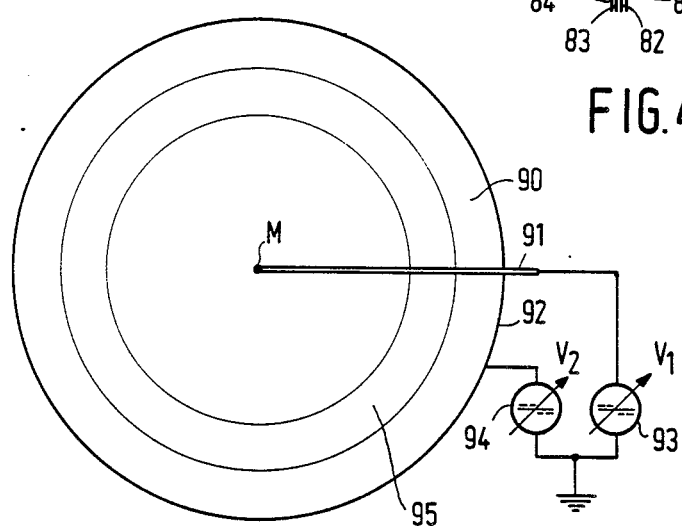
Figure 5B:
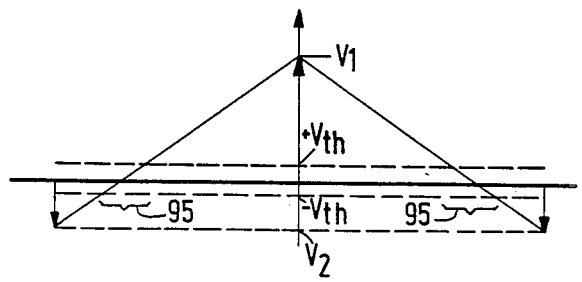

FIGS. 5a and 5b show diagrammatically how a liquid crystal diaphragm can be realized whose width and the position of the transparent part can be varied steplessly. A circular diaphragm is also used in this case for the purpose of illustration. Various other forms have been described in the above-cited article by R. A. Soref in Applied Optics, Vol. 9, page 1323 (June 1970). The centre M of the disc-shaped electrode 90 which may cover the entire surface of the diaphragm is brought via a first terminal 91 to a voltage $V_1$ with respect to the counter electrode on the other side of the crystal layer in the diaphragm. A second annular terminal 92 surrounding the entire electrode is brought to a voltage $V_2$ with respect to the counter electrode. The voltage $V_2$ has a sign which is opposite to that of the voltage $V_1$. The control circuit providing the voltages $V_1$ and $V_2$ is diagrammatically shown in the Figure by means of the controllable voltage sources 93 and 94.

FIG. 5b shows a possible voltage variation between the centre and a point on the outer edge of the electrode. An annular zone 95 is present between these two terminals where the absolute value of the voltage difference between the electrodes on both sides of the liquid crystal is smaller than the threshold value $V_{th}$ so that the diaphragm in this annular zone 95 is transparent. By varying $V_1$ and $V_2$ the position and the width of the transparent zone can be changed. A smaller absolute value of $V_1$ and a higher absolute value of $V_2$ means that the ring is moved to the centre of the diaphragm. A large difference between $V_1$ and $V_2$ implies a narrow band and a small difference implies a wide band.

What is claimed is:

1. An optical imaging system having an electronically variable focal length, comprising a system of lenses and a liquid crystal layer, characterized in that the system of lenses is divided into a plurality of sectors having different, constant focal lengths and in that the liquid crystal layer forms part of an electronically variable diaphragm including at least first and second terminals disposed on the surface of said layer for selecting sectors of the system of lenses and hence selecting a focal length.

2. An optical imaging system as claimed in claim 1, characterized in that sectors of the system of lenses having different focal lengths merge gradually.

3. An optical imaging system as claimed in claim 1, characterized in that transitions between sectors of the lens system are discontinuous.

4. An optical imaging system as claimed in claim 1, characterized in that the electronically variable diaphragm comprises electrodes disposed on opposed sides of the liquid crystal layer, which electrodes cover substantially the entire surface of the diaphragm and in which at least one of the electrodes has a plurality of terminals so that the electrode can be connected simultaneously to different voltages producing a voltage gradient in the electrode so that a gradually varying electric field is formed in the crystal.

5. An optical imaging system as claimed in claim 1, characterized in that the system of lenses is rotationally symmetrical.

6. An optical imaging system as claimed in claim 1, characterized in that the sectors of the system of lenses have a substantially equal surface area.

7. The optical imaging system as claimed in claim 1, further including a radiation sensitive surface and a control circuit, said control circuit having an input connected to said radiation sensitive surface and an output connected to said electronically variable focal length optical imaging system for varying the focal length of the system dependent upon the image focussed on said radiation sensitive surface.

* * * * *